United States Patent [19]

Drese

[11] Patent Number: 4,668,250
[45] Date of Patent: May 26, 1987

[54] PROCESS FOR CONTINUOUSLY REMOVING AND RECOVERING RESPECTIVELY A GAS DISSOLVED IN A LIQUID, PARTICULARLY AMMONIA FROM AQUEOUS AMMONIA WASTE WATER

[76] Inventor: Jan T. Drese, Debloemert 1-9, 9475.TG.Midlaren, Netherlands

[21] Appl. No.: 744,579

[22] Filed: Jun. 14, 1985

[51] Int. Cl.⁴ .............................................. B01D 53/14
[52] U.S. Cl. .......................................... 55/70; 55/84; 55/80
[58] Field of Search ................. 55/53, 70, 80, 84, 89

[56] References Cited

U.S. PATENT DOCUMENTS

| | | | |
|---|---|---|---|
| 3,920,419 | 11/1975 | Schroeder et al. | 55/70 |
| 4,149,857 | 4/1979 | Volke et al. | 55/70 X |
| 4,311,597 | 1/1982 | Bhattachoryya | 55/70 X |
| 4,530,821 | 7/1985 | Diemer | 55/70 X |

Primary Examiner—Charles Hart
Attorney, Agent, or Firm—Fleit, Jacobson, Cohn & Price

[57] ABSTRACT

A process is developed for continuously removing and recovering respectively ammonia from aqueous ammonia waste water by stripping the waste water in a column, using heat absorption from already stripped waste water and by using a gas flow, e.g. an air flow, flowing in counter current with the waste water through the column. Especially in view to the presently desired control of environmental pollution a know process involves such high investments that an economic solution often automatically fails. The invention eliminates such serious disadvantages whereas moreover an economically more valuable product can be obtained, e.g. water with a high concentration of aqueous ammonia.

This is achieved according to the invention in that the heat transfer is effected by a gas flow which, by direct contact in a packed bed, absorbs heat from the effluent liquid whereafter this absorbed heat is again transferred to the influent liquid. Preferably the gas flow consists of a recirculating air flow having a high temperature, said air flow transferring heat in a part of the column which is provided with a packed bed, to the waste water to be stripped, flowing in counter current to the low temperature waste water, whereafter the same air flow, now having a low temperature, recuperates in another part of the column, likewise provided with a packed bed, heat from the stripped liquid, now having a high temperature, also in counter current.

9 Claims, 3 Drawing Figures

PROCESS FOR CONTINUOUSLY REMOVING AND RECOVERING RESPECTIVELY A GAS DISSOLVED IN A LIQUID, PARTICULARLY AMMONIA FROM AQUEOUS AMMONIA WASTE WATER

The invention relates to a process for continuously removing and recovering respectively a gas dissolved in a liquid, particularly a process for continuously removing and recovering respectively ammonia form aqueous ammonia waste water by stripping the waste water in a column, using heat absorption from already stripped waste water and by using a gas flow, e.g. an air flow, flowing in counter current with the waste water through the column.

A process is known in which for the exchange of heat very large heat transfer surfaces are required and in connection therewith the use of expensive stainless steel as a material. Especially in view to the presently desired control of environmental pollution this involves such high investments that an economic solution often automatically fails. It is a first objective of the invention to eliminate said disadvantages whereas moreover an economically more valuable product can be obtained, e.g. water with a high concentration of aqueous ammonia.

According to the invention the first objective is achieved in that the heat transfer is effected by a gas flow which, by direct contact in a packed bed, absorbs heat from the effluent liquid whereafter this absorbed heat is again transferred to the influent liquid. Preferably, according to the invention the gas flow consists of a recirculating air flow having a high temperature, said air flow transferring heat in a part of the column which is provided with a packed bed, to the waste water to be stripped, flowing in counter current to the low temperature waste water, whereafter the same air flow, now having a low temperature, recuperates in another part of the column, likewise provided with a packed bed, heat from the stripped liquid, now having a high temperature, also in counter current. According to the invention the second objective is achieved in that the concentration of ammonia in the waste water to be stripped is firstly increased in the first part of the column, preferably by the recirculating air flow, containing a higher concentration of the gas to be stripped than corresponds to the partial gas pressure in the waste water, whereafter the waste water is further preferably again brought in contact with the air flow in the second part of the column, the concentration being now lower than corresponds with the partial gas pressure in the waste water.

If further according to the invention, a portion of the air flow which is contained between the two packed beds is diverted therefrom in order to separate from it, particularly by cooling in and/or subjecting it to an increased pressure, higher concentrated aqueous ammonia water, than a valuable good salable finished product is obtained.

The invention will be explained herinafter.

The usual process of stripping ammonia from waste water is supposed to be known.

Figure 1:
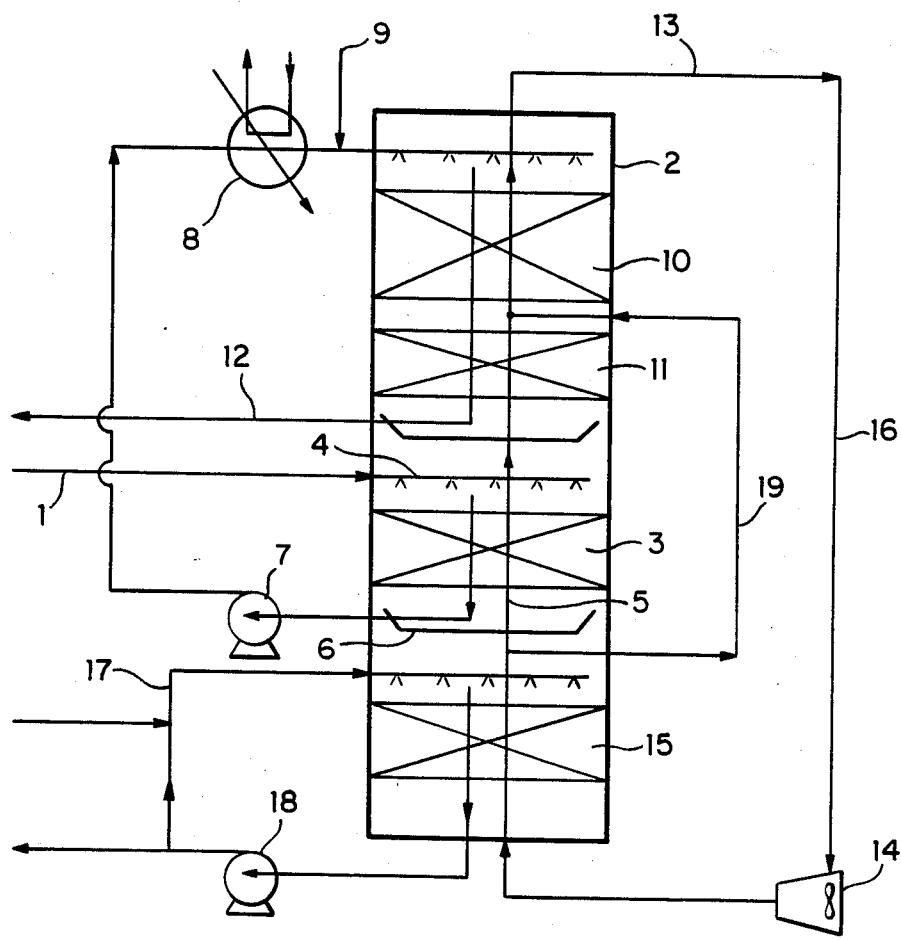
FIG. 1 is a flow diagram for the process of the invention.

According to the invention, FIG. 1, waste water containing ammonia is supplied through conduct 1 to a packed bed 3 provided in column 2, the water is distributed by means of sprayers 4 and is brought in contact with an air flow 5 which is carried in counter current through the bed 3. The water to be stripped has a temperature of 30° C., the influent air flow 5 is of a temperature of 62.2° C. and is saturated with water vapour. The influent water is heated by the air causing its temperature to increase to 60° C. when leaving packed bed 3. Heat transfer is mainly effected by condensation of water vapour from the air into the water and the air temperature decreases til 31.5 C., remaining saturated with water vapour, but the water content, as a result of the lower temperature, is much less than while entering.

In the packed bed 3 ammonia is not yet stripped from the water since the pH value of the water is much lower than 11 and otherwise the water to be stripped would again absorb this ammonia. The water which comes from the packed bed 3 is collected by tray 6 and it is supplied to a heating device 8 by a pump 7. The stripping of ammonia becomes only possible when the pH of the water reaches a value of 11 by the injection of caustic soda via conduct 9, before or after passing the heating device 8, whereby the water is heated to 62° C. Water sprayed over the packed bed 10 is contacting the air which has previously been carried through the packed bed 3 thereby taking ammonia. Air in packed bed 22 is first heated from 31.5° C. to 60° C. by the water stripped from ammonia in packed bed 10, thereby absorbing water vapour.

In column 2 the beds 10 and 11 mostly constitute one package. The total height of such package is less than the sum of the individual heights which are calculated theoretically because heat exchange and stripping takes place in the packages 10 and 11. The air enriched with ammonia leaves column 2 at 13 at a temperature of 60° C. and is than transported by means of a fan 14 to the absorber portion 15 in which the ammonia reacts with sulfuric acid to form ammonia sulfate. The supply of water in which sulfuric acid is dissolved is indicated at 17 and pump 18 circulates the water over bed 15 and also carries away the excess liquid. Air at a temperature of 62.2° C. leaves the absorber portion 15 and enters the packed bed 3 completing the cycle of the air flow. Both in the stripper portion and in the absorber portion reactions take place and simultaneously heat is generated. In case the optimal air flows through the beds 3 and 11 and the stripper/absorber portion 10 and 15 respectively are unequal, a bypass 19 can be of use.

The packed beds 3 and 11 fulfil a similar function as a convential heat exchanger but they are considerably cheaper. At a water influent of 200,000 kg/h, preheated from 30° C. to 60° C. by means of a water flow, thereby cooling down from 62° C. to 32° C., a heat exchanging surface would be needed of 2,000 m$^2$ and performed in stainless steel, this would cost about Dfl. 1,400,000. When using the process according to the invention the system for heat exchange would only require 5% therefrom i.e. Dfl. 70,000.

It will be clear for someone skilled in the art, that the supply of energy to the air flow could also take place by means of direct injection of steam whereas the process need not necessarily take place in one column. While using in the foregoing the expression "packed bed", one may also use other means known per se to establish contact between liquid/gas, e.g. sieve plate or the like. In the above the recirculating gas being air, nevertheless also another gas, such as hydrogen or helium can be used in so far that their characteristic properties would give rise thereto in the light of costs. Further it is observed that the process can be carried out under atmospheric pressure but also another system pressure will be possible within the scope of the invention.

It is possible that a portion of the gas is stripped from the liquid in packed bed 3 which would affect the efficiency of the process. By interpousing an extra absorber (not shown) between the packed beds 3 and 11 this can be prevented. Fouling of the equipment caused by waste water containing much carbon dyoxide, can easily be prevented by carrying the gas which contained stripped carbon dioxide through a sieve plate upon which a liquid is provided reacting with carbon dioxide, making the removal of resulting carbonates easy. Moreover the adhesion of such carbonates to parts of the equipment can be prevented to a large extent by the execution of parts of the equipment or lining of such parts of the equipment with a material that repells such carbonates. "Teflon" is very suitable. Within the scope of the invention it is obvious that various embodiments are possible. Periodical maintenance could favor the installation of multiple absorbers/stripper sections and also it could be desirable to use two or more circulating gas circuits. It has been said before that it is not absolutely necessary to circulate the carrying gas flow. These technological considerations are not further explained here because they are obvious for someone skilled in the art within the scope of the invention.

Figure 2:
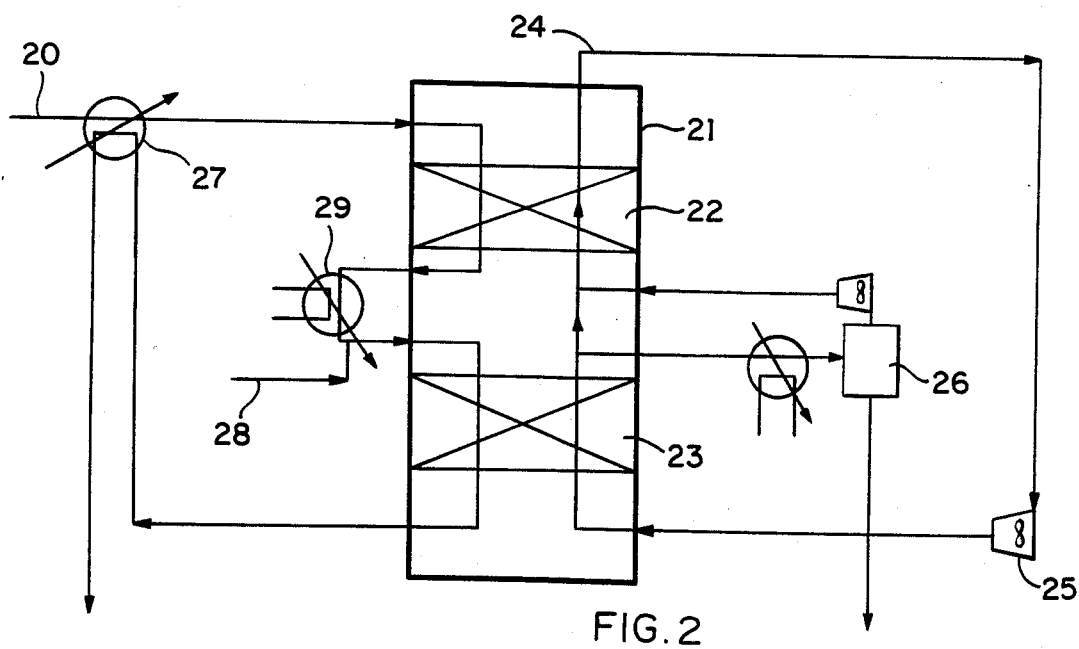
FIG. 2 shows a stripper/absorber, appropriate for the production of a concentrated solution of the gas to be stripped in the liquid

In FIG. 2 the advantages of the invention are schematically indicated in obtaining a valuable aqueous ammonia solution. On the left side in FIG. 2 conduct 20 supplies waste water from which ammonia has to be stripped and/or from which a concentrated aqueous ammonia solution is to be produced with an acceptable efficiency.

As an example waste water influent is at a capacity of 20 m³/h containing 80 kg ammonia at the prevailing temperature and pressure. In the stripper/absorber column 21, the gas flow circulates through the packed beds 22 and 23 through conduct 24 and by means of a fan 25. The production of an aqueous ammonia solution takes place at 26 and amounts 72 kg/h by cooling down a portion derived from the circulating gas flow, see the flow diagram. A conventional heat exchanger 27 raises the temperature of the waste water from 15° C. to 50° C. whereafter the temperature in packed bed 22 is further increased to 60° C. The temperature is further increased to 70° C. by heat transfer in heat exchanger 29 followed by the addition of potassium or lye through conduct 28 during which the packed bed 23 is passed by in counter current. As a result the treated waste water leaves the heat exchanger at 25° C. and than only 8 kg/h has been left from the original 80/h of ammonia. Depending on the objective which is achieved, requirements for draining of/or the value of the concentrate, the latter can be used as such or it can furthermore be stripped. Anyway the major interest of the applicable process can at one time be seen in the savings for a conventional exchanger and for the other time in the value of the concentrate to be obtained.

Where in the foregoing ammonia and waste water are mentioned it is expressly observed that the advantages of the invention have also value for other gases which are dissolved in liquids and which have to be removed or to be recovered therefrom respectively.

It is preferred to use the process according to the invention from an economical point of view expressly by direct contact between the waste water and the gas flow. Nevertheless it would yet be possible to achieve the advantages of the invention also by means of an indirect contact. It is therefor claimed that the embodiment opens both the possibility of direct contact and indirect contact. The expression "direct contact" in the claims must therefor be seen in view to the preceding explanation.

Figure 3:
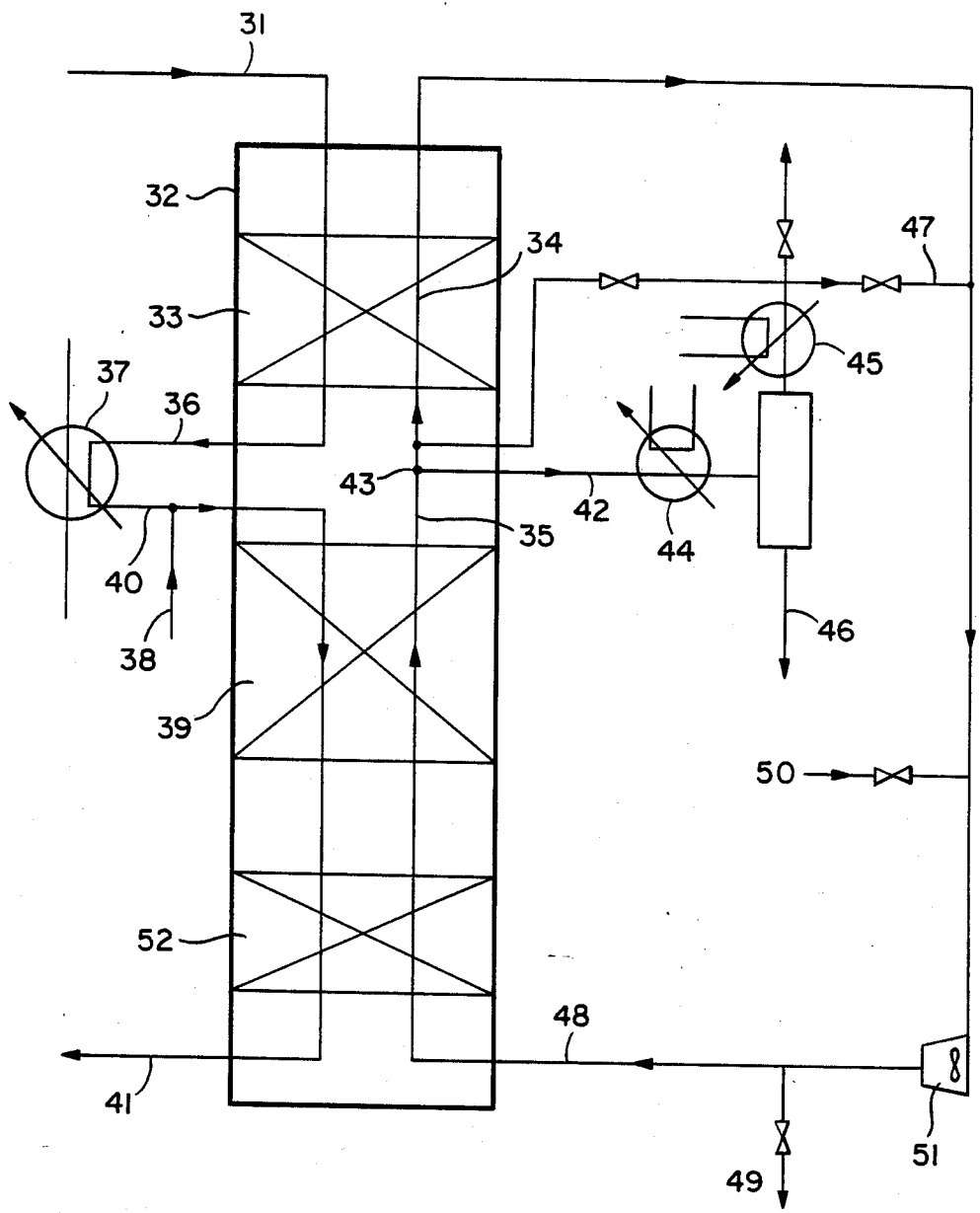
FIG. 3 shows the flow diagram for changing the concentration of the ammonia to be stripped.

FIG. 3 shows schematically in a flow diagram the second objective of the invention. Aqueous ammonia waste water 31 is supplied to column 32 and is brought in contact with a recirculating gas flow 34 in counter current in packed bed 33. The pH-value of the water at 31 is still low so that most of the ammonia is present in the water as an ammonium ion. The gas flow, transported to packed bed 33 has a high concentration of ammonia and is saturated with water vapour and subjected to a rather high temperature. In packed bed 33 the water absorbs ammonia from the gas flow which is assisted by the fact that at this low pH-value most of the ammonia is absorbed in the water as an ion, the vapour pressure of the ammonia, in equilibrium with the water, being lower, than when ammonia would be dissolved as a gas.

The water leaves at 36 the packed bed 33 at a higher temperature and at a higher concentration of the ammonia than at the inlet at 31. The temperature increase of the water is mainly effected by condensation of water vapour and by the solution of ammonia from the gas flow. To obtain an operating power in the system the water temperature is still further increased in the heat exchanger 37 and thereafter at 38 lime or lye is added to the water in order to increase the pH-value in such a way as to easily strip the ammonia. The water in packed bed 39 is brought in contact with the circulating air flow. Because of the fact that the water temperature at 40 is higher than at 36, the vapour pressure of the water and the potential pressure of the dissolved ammonia at 40 is higher than at 36. The pH-value being higher at 40 than at 36, the difference of the partial pressure of the ammonia is further augmented.

The gas flow at 35 has a concentration of ammonia and water vapour lying between the equilibrium values which belong to the water flows 36 and 40 respectively. The mass and heat transfer is in packed bed 33 directed from the gas to the water and in packed bed 39 it is directed from the water to the gas. The water is stripped from ammonia in packed bed 39, causing a decrease in temperature of the water. The stripped water leaves the column at 41 the column at a temperature which is higher than the temperature of the influent water. This increase in temperature is equal to the net added heat energy to the system, minus the heat energy which is required for stripping the originally available ammonia content from the water. The temperature of the gas which is saturated with water vapour at 48 is between the temperature of the influent water at 31 and the effluent water at 41.

If no ammonia is derived from the system, the concentration of ammonia in the flows 36, 40 and 35 would continue to increase. Ammonia can be derived from the system by diverting a portion of the aqueous ammonia water flow. Thus one obtains water with a higher content of ammonia than at 31 at the influent water. A higher content of aqueous ammonia can be obtained by diverting a portion of the circulating gas flow at 42 and cooling it down in coolers 44 and 45, thereby condensating the water vapour. The major part of the ammonia from the gas flow 42 dissolves in the condensed water. This solution leaves the system at 46 and the cooled gas can again be added at 47 to the circulating gas, i.e. column 32 or it can be removed from the system.

The composition of the aqueous ammonia solution 46 can be varied by changing the quantity of the gas which is derived from the system at 42. The value of the pressure under which the liquids at 44 are condensed and the value of the pressure in column 32 need not be the same. By increasing the pressure at 44, one can decrease the quantity of stripped material, i.e. ammonia in the gas flow 47.

The packed beds 33 and 39 are serving the purpose as an absorber and stripper respectively, but also as a heater and heat recuperator respectively. In packed bed 33 heat is absorbed by the water from the circulating gas which has absorbed heat from the stripped water in packed bed 39. Doing so it is possible to strip at a high temperature without a great heat supply, which advances the stripping of gas from a liquid.

Furthermore it is observed that in the foregoing the expression "counter current" has been used. This expression must however be considered in a broader sense since, while accepting a lower efficiency, also the cross current flow principle could be used within the scope of the invention.

Further it is also possible by deriving a portion of the circulating gas flow from the system, to counteract the building up of a concentration of a gas. In case of the stripping of ammonia and carbon dioxide from water, as is indicated at 49, air and carbon dioxide can be derived, but than air must be added to the system at 50.

A conventional fan is indicated at 51 whereas an extra absorber is shown at 52, e.g. to bind carbon dioxide. This has been discussed before.

I claim:

1. A process for continuously removing and recovering a gas dissolved in a liquid, particularly a process for continuously removing and recovering ammonia from aqueous ammonia waste water in a column comprising the steps of
   distributing the waste water through a packed bed;
   directly contacting the waste water with a heated countercurrent flowing gas across said first packed bed to increase the temperature of the waste water and cool the gas;
   increasing the pH of the waste water after the waste water has passed through said first packed bed;
   distributing said waste water through a second packed bed; and
   stripping the gas from the waste water by directly contacting the waste water with the cooled countercurrent flowing gas across said second packed bed.

2. A process according to claim 1 further comprising the step of returning said countercurrent flowing gas after it has passed through said second packed bed to said first packed bed to obtain a cyclical countercurrent gas flow.

3. A process according to claim 1 wherein the pH of the waste water is increased by adding caustic.

4. A process according to claim 1 further comprising the step of
   heating said waste water after it has passed through said first packed bed and before said waste water is distributed across said second packed bed.

5. A process according to claim 1 further comprising the steps of:
   diverting part of said countercurrent flowing gas after it has passed through said second bed to an aqueous ammonia solution production unit; and
   producing an aqueous ammonia solution by cooling and/or subjecting said countercurrent flowing gas to an increased pressure.

6. A process according to claim 1 wherein said dissolved gas is ammonia and further comprising the steps of
   increasing the concentration of ammonia in said waste water wherein said waste water contains a higher concentration of the gas to be stripped than corresponds to the partial gas pressure in the waste water by directly contacting it with said countercurrent flowing gas across said first packed bed; and
   subsequently decreasing the concentration of ammonia in said waste water wherein said waste water contains a lower concentration of the gas than corresponds to the partial gas pressure in the waste water by directly contacting it with said countercurrent flowing gas across said second packed bed.

7. A process according to claim 1 further comprising the step of removing a portion of said countercurrent flowing gas after it has passed through said second packed bed.

8. A process according to claim 1 further comprising the steps of
   transporting the countercurrent flowing gas after it has passed through said second packed bed to an absorber;
   reacting and simultaneously heating the countercurrent flowing gas by reaction with an acid across a bed of said absorber; and
   returning said heated and reacted countercurrent flowing gas to said first bed to obtain a cyclical countercurrent gas flow.

9. A process according to claim 1 wherein said acid is sulfuric acid.

* * * * *